(12) United States Patent
Darby

(10) Patent No.: US 11,241,963 B2
(45) Date of Patent: Feb. 8, 2022

(54) CONFIGURABLE USER INTERFACE METHOD AND APPARATUS

(71) Applicant: JAGUAR LAND ROVER LIMITED, Warwickshire (GB)

(72) Inventor: Richard Darby, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/342,382

(22) PCT Filed: Oct. 4, 2017

(86) PCT No.: PCT/EP2017/075158
§ 371 (c)(1),
(2) Date: Apr. 16, 2019

(87) PCT Pub. No.: WO2018/086800
PCT Pub. Date: May 17, 2018

(65) Prior Publication Data
US 2019/0241072 A1  Aug. 8, 2019

(30) Foreign Application Priority Data
Nov. 11, 2016 (GB) .................................. 1619067

(51) Int. Cl.
*B62D 1/04* (2006.01)
*B60K 37/06* (2006.01)

(52) U.S. Cl.
CPC .............. *B60K 37/06* (2013.01); *B62D 1/046* (2013.01); *B60K 2370/122* (2019.05);
(Continued)

(58) Field of Classification Search
CPC .............. B60K 37/06; B60K 2370/122; B60K 2370/1446; B60K 2370/1438; B60K 2370/782; B62D 1/046
See application file for complete search history.

(56) References Cited

U.S. PATENT DOCUMENTS 5,555,502 A * 9/1996 Opel .................. B60H 1/00985
701/36
2011/0209091 A1  8/2011 Bucciarelli et al.
(Continued)

FOREIGN PATENT DOCUMENTS

EP           1445687 A2     8/2004
WO       2014/107513 A2     7/2014

OTHER PUBLICATIONS

Combined Search and Examination Report under Sections 17 and 18(3) for Application No. GB1619067.0 dated May 9, 2017.
(Continued)

*Primary Examiner* — Towfiq Elahi
(74) *Attorney, Agent, or Firm* — Carlson, Gaskey & Olds, P.C.

(57) ABSTRACT

The present disclosure relates to a configurable user interface for a vehicle (V). The configurable user interface includes a plurality of control devices for controlling a first set of vehicle systems (S-n). The control devices are each associated with at least one of the vehicle systems (S-n) in said first set. At least one processor is provided for identifying a subset of the first set of vehicle systems (S-n) consisting of the vehicle system(s) (S-n) installed on the vehicle (V). A memory is connected to the at least one processor. The at least one processor is configured to enable any of said control devices associated with the vehicle systems (S-n) contained in said subset; and/or to disable any of said control devices associated with the vehicle systems (S-n) not contained in said subset. The present disclosure also relates to a steering wheel of a vehicle (V) incorporating a configurable user interface. A vehicle (V) and a method of configuring a user interface are also disclosed.

17 Claims, 3 Drawing Sheets

(52) U.S. Cl.
CPC .............. *B60K 2370/1438* (2019.05); *B60K 2370/1446* (2019.05); *B60K 2370/782* (2019.05)

(56) References Cited

U.S. PATENT DOCUMENTS

| | | | |
|---|---|---|---|
| 2012/0197486 A1* | 8/2012 | Elliott | G07C 5/008 |
| | | | 701/33.2 |
| 2015/0138097 A1 | 5/2015 | Yamada | |
| 2015/0210287 A1* | 7/2015 | Penilla | G06F 3/04842 |
| | | | 701/49 |
| 2015/0253922 A1 | 9/2015 | Goodiein | |
| 2015/0336608 A1* | 11/2015 | Burcar | B62D 6/10 |
| | | | 701/41 |

OTHER PUBLICATIONS

International Search Report and Written Opinion of the International Searching Authority for International application No. PCT/EP2017/075158 dated Jan. 10, 2018.

\* cited by examiner

CONFIGURABLE USER INTERFACE METHOD AND APPARATUS

TECHNICAL FIELD

The present disclosure relates to a configurable user interface method and apparatus. Particularly, but not exclusively, the present disclosure relates to a configurable user interface for a vehicle. Without limitation, the user interface may be installed in a vehicle steering wheel. The present disclosure also relates to a method of configuring a user interface. Aspects of the invention relate to a configurable user interface, to a vehicle steering wheel, to a vehicle, and to a method.

BACKGROUND

It is known to provide control devices in a user interface disposed on a vehicle steering wheel to control vehicle systems on the vehicle. The control functions are readily accessible to the driver and can usually be operated without requiring that the driver takes their hands off the vehicle steering wheel. A wide range of vehicle systems can be installed on the vehicle, for example depending on configuration and/or specification. It is desirable to match the configuration of the control interface and the installed vehicle systems to avoid the presence of redundant control devices on the steering wheel. In order to satisfy the different variants of a vehicle, there may be multiple variants of the user interface for the steering wheel. This is due to the need to remove graphics and/or control devices relating to features which are not installed on the vehicle as these might otherwise mislead the user into thinking that those features are present. It is against this backdrop that the present invention(s) have been conceived.

At least in certain embodiments, the present invention seeks to overcome or ameliorate at least some of the shortcomings of prior art arrangements.

SUMMARY OF THE INVENTION

Aspects of the present invention relate to a configurable user interface; to a vehicle steering wheel; to a vehicle and to a method as claimed in the appended claims.

According to a further aspect of the present invention there is provided a configurable user interface for a vehicle, the configurable user interface comprising:
- a plurality of control devices for controlling a first set of vehicle systems, each of the control devices being associated with at least one of the vehicle systems in said first set;
- at least one processor for identifying a subset of the first set of vehicle systems consisting of the vehicle system(s) installed on the vehicle; and
- a memory connected to the at least one processor;
- wherein the at least one processor is configured to enable any of said control devices associated with the vehicle systems contained in said subset; and/or to disable any of said control devices associated with the vehicle systems not contained in said subset.

In an embodiment, the at least one processor is configured to enable any control devices for which the associated vehicle system is installed. However, in a given vehicle, only some of the vehicle systems may be installed, for example depending on the vehicle configuration or specification. Thus, the user interface may comprise control devices which are associated with one or more vehicle systems which are not installed on the vehicle. In this case the at least one processor is configured to disable any control devices for which the associated vehicle system is not installed on the vehicle. In this manner the user interface can be configured to match the vehicle systems installed on the vehicle. At least in certain embodiments, the user interface may be configured automatically.

The control devices may each comprise at least one light emitting device. The at least one processor may be configured to control said at least one light emitting device to hide or obfuscate any control devices associated with vehicle systems which are not installed on the vehicle. Enabling each control device may comprise energising the at least one light emitting device associated with that control device. Disabling each control device may comprise de-energising the at least one light emitting device associated with that control device. Each said control device may be visible when said light emitting device is energised and at least partially hidden from view when said light emitting device is de-energised. The control devices may each comprise or consist of a hidden-until-lit display. The hidden-until-lit display may, for example, comprise a semi-transparent panel and an opaque mask having cut-outs to form symbols or indicia representative of the control function. The semi-transparent panel may, for example, comprise a coloured transparent plastics material.

Alternatively, or in addition, the at least one processor may be configured to disable any control devices associated with vehicle systems which are not installed on the vehicle. Enabling each control device may comprise enabling the output of control signals from that control device. Disabling each control device may comprise disabling the output of control signals from that control device.

The plurality of control devices may each comprise a user operable switch. The user operable switch may be a touch switch. The user operable switch may, for example, comprise a capacitance switch or a resistance switch. Enabling each control device may comprise energising the user operable switch in that control device. Disabling each control device may comprise de-energising the user operable switch in that control device.

The plurality of control devices may comprise one or more disc-shaped controller. The disc-shaped controller may comprise one or more user operable switches which may be selectively enabled and disabled in accordance with aspects of the present invention.

The at least one processor may be configured to communicate with a memory device disposed on the vehicle to identify the subset of said first set of vehicle systems. The at least one processor may be configured to read a vehicle configuration file stored in said memory device.

The at least one processor may be configured to communicate with one or more of the first set of vehicle systems to identify the subset of said first set of vehicle systems which is installed on the vehicle.

The subset may be a proper subset consisting of some of the first set of vehicle systems. Alternatively, the subset may be an improper subset consisting of all of the first set of vehicle systems.

The first set of vehicle systems may comprise one or more of the following: a cellular telephone system; an infotainment control system; a voice recognition system; a shortcut select system; an adaptive cruise control system; a lane keep assist system; a speed limiter system; and a heated steering wheel system. Alternatively, or in addition, the first set of vehicle systems may comprise one or more of the following: an autonomous emergency braking system; a park assist system; a traction control system; a suspension control system; a transmission control system; a throttle mapping system; a high/low range gear control system; and a driveline control system.

According to a further aspect of the present invention there is provided a vehicle steering wheel comprising a configurable user interface as described herein.

According to a still further aspect of the present invention there is provided a vehicle comprising a configurable user interface as described herein. The configurable user interface may be provided in a steering wheel of the vehicle.

The configurable user interface may be operable to control a plurality of vehicle systems. Some of these vehicle systems may not be installed on the subject vehicle. The at least one processor may be configured to identify the subset of vehicle systems from said first set which are installed on the vehicle. The at least one processor may be configured selectively to enable the control devices associated with any vehicle systems installed on the vehicle; and/or to disable the control devices associated with any vehicle systems which are not installed on the vehicle. The configurable user interface may be configured to communicate with a vehicle system controller to determine which of said vehicle systems are present on the vehicle; and/or to determine which of said vehicle systems are absent from the vehicle.

According to a further aspect of the present invention there is provided a configurable user interface for a vehicle, the configurable user interface comprising:
  a plurality of control devices, each control device being associated with at least one vehicle system;
  at least one processor for detecting the presence and/or absence of the vehicle systems associated with said control devices; and
  a memory connected to the at least one processor;
  wherein the at least one processor is configured to enable said one or more control device associated with one or more of said vehicle systems detected as being present on the vehicle; and/or to disable any of said control devices associated with said vehicle systems detected as being absent from the vehicle.

According to a further aspect of the present invention there is provided a method of configuring a user interface for a vehicle, the user interface comprising a plurality of control devices for controlling a first set of vehicle systems, each of the control devices being associated with at least one of the vehicle systems in said first set; the method comprising:
  identifying a subset of the first set of vehicle systems consisting of the vehicle system(s) installed on the vehicle; and
  enabling any of said control devices associated with the vehicle systems contained in said subset; and/or disabling any of said control devices associated with the vehicle systems not contained in said subset.

The control devices may each comprises at least one light emitting device. The method may comprise: enabling each control device by energising the at least one light emitting device associated with that control device; and disabling each control device by de-energising the at least one light emitting device associated with that control device.

Enabling each control device may comprise enabling the output of control signals from that control device. Disabling each control device may comprise disabling the output of control signals from that control device.

The control devices may each comprise a user operable switch. The user operable switch may be a touch switch. Enabling each control device may comprise energising the user operable switch in that control device. Disabling each control device may comprise de-energising the user operable switch in that control device.

The method may comprise communicating with a memory device disposed on the vehicle to identify the subset of said first set of vehicle systems. The method may comprise reading a vehicle configuration file stored in said memory device.

The method may comprise communicating with one or more of the first set of vehicle systems to identify the subset of said first set of vehicle systems installed on the vehicle.

The subset may be a proper subset consisting of some of the first set of vehicle systems. Alternatively, the subset may be an improper subset consisting of all of the first set of vehicle systems.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
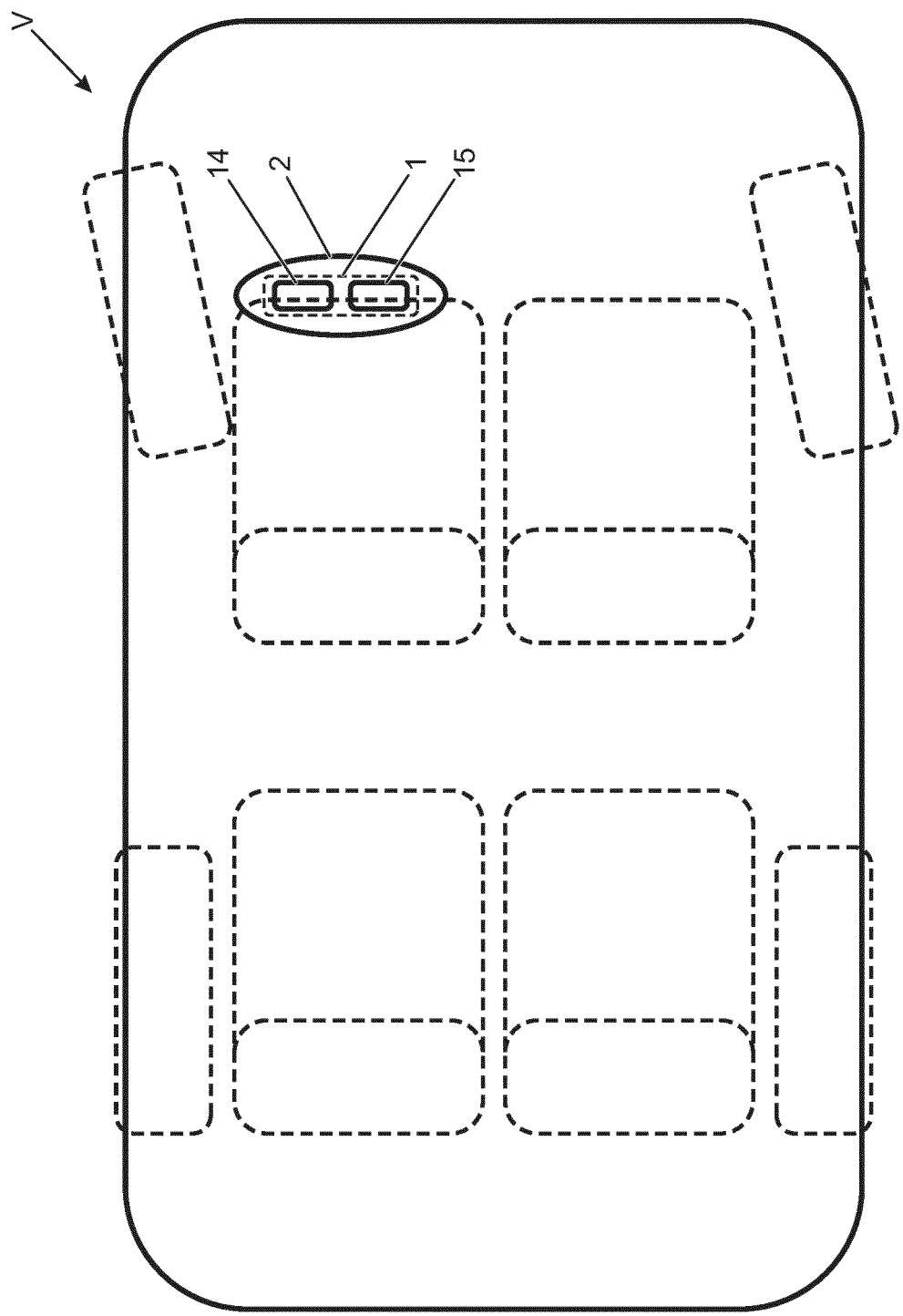
FIG. 1 shows a schematic representation of a vehicle incorporating a user interface in accordance with an embodiment of the present invention.

A user interface 1 in accordance with an embodiment of the present invention will now be described with reference to the accompanying figures. The user interface 1 in accordance with the present embodiment is configured for use in a vehicle V to provide user control of on-board vehicle systems S-n. In the present embodiment the user interface 1 is disposed on a steering wheel 2 of the vehicle V. A schematic representation of the vehicle V and the user interface 1 is shown in FIG. 1.

The user interface 1 is operable to provide control of a first set of vehicle systems S-n. The first set represents all of the vehicle systems S-n that can conceivably be controlled by the user interface 1. In the present embodiment the first set comprises a plurality of said vehicle systems S-n. The user interface 1 can provide independent control of each of the vehicle systems S-n in said first set. By way of example, the user interface 1 may enable the user selectively to enable/disable one or more of the vehicle systems S-n in said first set; and/or to adjust operating parameters of one or more of the vehicle systems S-n in said first set. However, all of the vehicle systems S-n making up said first set are not necessarily installed on a given vehicle V. For example, only some of the first set of vehicle systems S-n may have been specified for a particular model or configuration of the vehicle V. As described herein, the user interface 1 is configurable to provide control of those vehicle systems S-n which have been installed on the vehicle V. The installed vehicle systems S-n form a subset of the first set of vehicle systems S-n.

Figure 2:
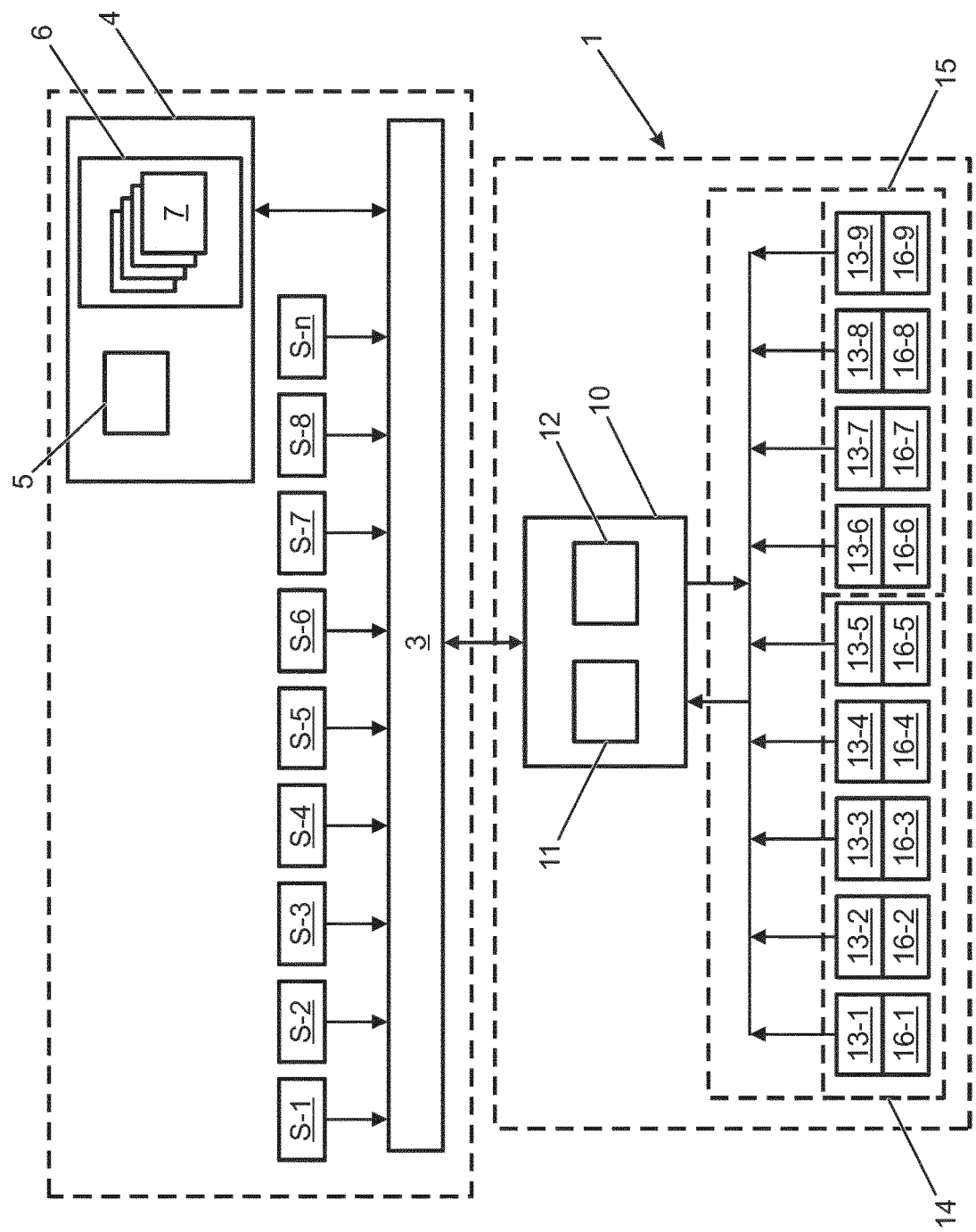
FIG. 2 shows a block diagram of the user interface shown in FIG. 1.

As shown in FIG. 2, in the present embodiment the first set of vehicle systems S-n comprises: a cellular telephone system S-1 for pairing with a cellular telephone; an infotainment control system S-2; a voice recognition system S-3; a shortcut select system S-4 for providing a user-defined shortcut within the infotainment system; an adaptive cruise control system S-5; a lane keep assist system S-6; a speed limiter system S-7; and a heated steering wheel system S-8. At least one of the first set of vehicle systems S-n is optional and may not be installed on the vehicle V. Thus, the vehicle systems S-n installed on the vehicle V may be a subset of the first set of vehicle systems S-n. The subset may consist of some of the first set of vehicle systems S-n (i.e. a proper subset of the first set); or may consist of all of the first set of vehicle systems S-n (an improper subset of the first set). It will be understood that different vehicles V may have different subsets of the vehicle systems S-n. It is noted that certain vehicles V may not have any of the first set of vehicle systems S-n installed. The user interface 1 in accordance with the present embodiment is configurable to provide control of the subset of the first set of vehicle systems S-n corresponding to the vehicle systems S-n which are installed on the vehicle V. The same user interface 1 may be used to control different configurations of the available vehicle systems S-n. At least in certain embodiments the configuration of the user interface 1 is performed automatically.

The vehicle systems S-n are each connected to a vehicle communication network 3. The vehicle systems S-n publish data to the vehicle communication network 3 and/or read data from the vehicle communication network 3. The vehicle systems S-n are implemented by a vehicle system controller 4 disposed in the vehicle V. The vehicle system controller 4 comprises a first electronic processor 5 connected to a first memory device 6. A vehicle configuration file 7 is stored in the first memory device 6. The vehicle configuration file 7 comprises a record of which of the first set of vehicle systems S-n are installed on the vehicle V. The vehicle configuration file 7 thereby defines the subset of the first vehicle systems S-n which are installed on that vehicle V.

The vehicle configuration file 7 may be updated to reflect the addition (or removal) of one or more of the vehicle systems S-n.

In the present embodiment, the user interface 1 is installed in the steering wheel 2. It is envisaged that the user interface 1 would be provided in left-hand and right-hand variants depending on whether the vehicle V is left-hand or right-hand drive. For the sake of brevity, only the left-hand variant of the user interface 1 is described herein, but it will be understood that the concepts may be employed in the right-hand variant. The user interface 1 comprises an interface controller 10 having a second electronic processor 11 connected to a second memory device 12. The interface controller 10 is housed within the steering wheel 2 and is configured to communicate with the vehicle communication network 3. The user interface 1 comprises a first switch pack 14 and a second switch pack 15 disposed on opposing sides of the steering wheel 2 The first and second switch packs 14, 15 each comprise a plurality of user operable switches 13-$n$ for controlling the vehicle systems S-n. The user operable switches 13-$n$ each comprise a touch switch, for example a capacitance switch. Each of said user operable switches 13-$n$ is associated with at least one of the first set of vehicle systems S-n. The interface controller 10 is configured to control the user operable switches 13-$n$ such that only those user operable switches 13-$n$ associated with the subset of the first set of vehicle systems S-n installed on the vehicle V are enabled. The interface controller 10 is configured to control the user operable switches 13-$n$ such that any user operable switches 13-$n$ associated with vehicle systems S-n outside the subset of said first set are disabled. The composition of the first and second switch packs 14, 15 will now be described in more detail.

Figure 3:
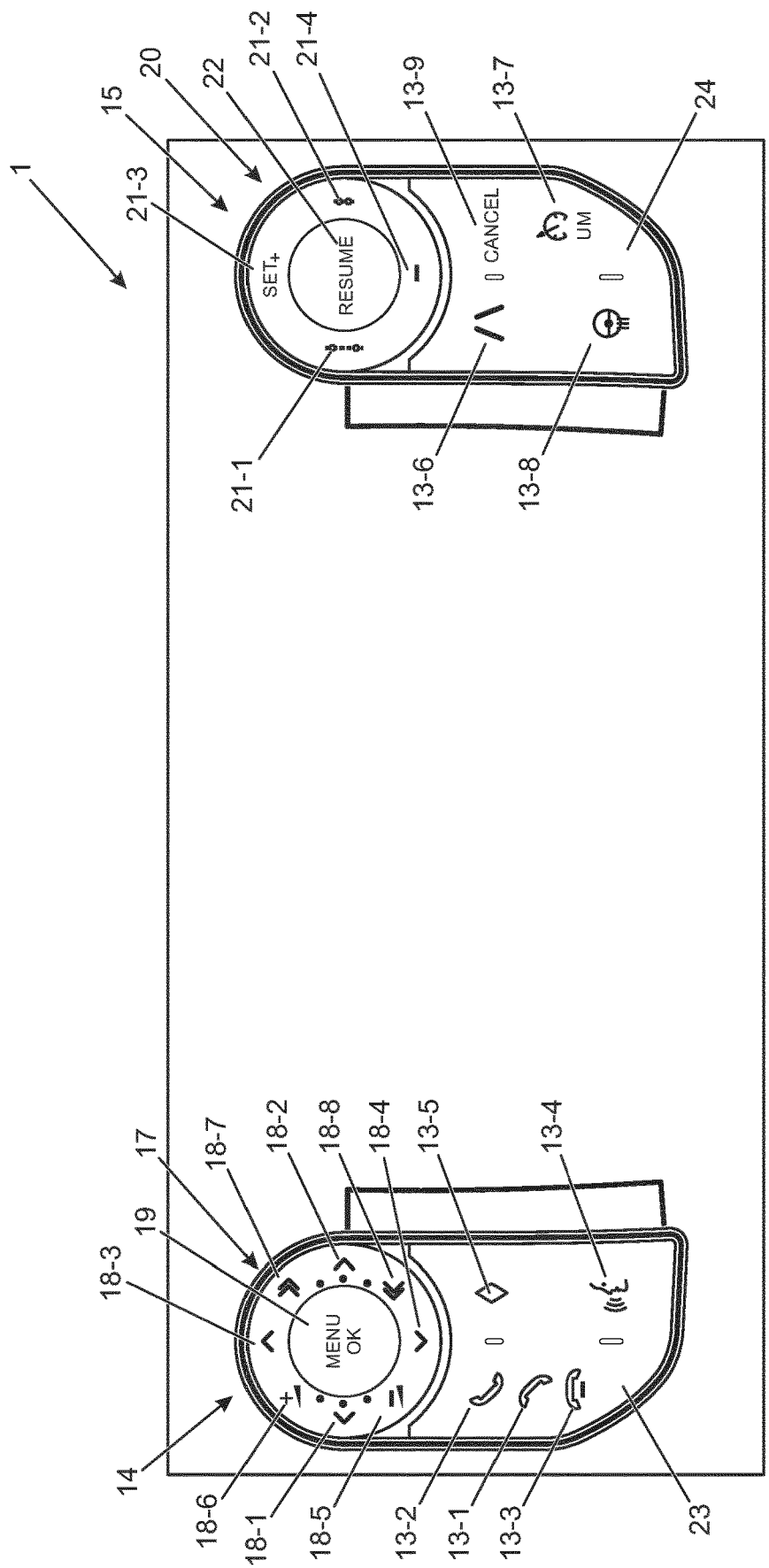
FIG. 3 illustrates the configuration of the user operable switches on the user interface shown in FIGS. 1 and 2.

With reference to FIGS. 2 and 3, the first switch pack 14 comprises first, second and third user operable switches 13-1, 13-2, 13-3 for controlling the cellular telephone system S-1; a fourth user operable switch 13-4 for controlling the voice recognition system S-3; and a fifth user operable switch 13-5 for controlling the shortcut select system S-4. The first, second and third user operable switches 13-1, 13-2, 13-3 are configured respectively to enable the cellular telephone system S-1; to accept a telephone call via the cellular telephone system S-1; and to end a call via the cellular telephone system S-1. The fourth user operable switch 13-4 is configured to enable the voice recognition system S-3 in preparation for issuing a voice command to the vehicle V. The first, second, third, fourth and fifth user operable switches 13-1 to 13-5 are each in the form of a capacitance switch. The first switch pack 14 also comprises separate light emitting devices 16-$n$ for illuminating the user operable switches 13-$n$. The light emitting devices 16-$n$ in the present embodiment are in the form of first, second, third, fourth and fifth light emitting diodes (LEDs) 16-1 to 16-5 which are associated with the first, second, third, fourth and fifth user operable switches 13-1 to 13-15 respectively.

The first switch pack 14 also comprises a first disc-shaped controller 17 for controlling the infotainment control system S-2. The first disc-shaped controller 17 comprises a plurality of first control switches 18-$n$ for selectively operating the infotainment control system S-2 and/or traversing menus displayed on a graphical interface. In the present embodiment, the first control switches 18-$n$ comprise cardinal direction switches 18-1, 18-2, 18-3, 18-4; volume control switches 18-5, 18-6; and seek left and seek right switches 18-7, 18-8. The first control switches 18-$n$ each comprise a touch switch, for example a capacitance switch, but could be implemented as a mechanical switch. The first control switches 18-$n$ may optionally be controlled by the interface controller 10. The interface controller 10 may be configured to control the first control switches 18-$n$ such that only those first control switches 18-$n$ associated with the subset of the first set of vehicle systems S-n installed on the vehicle V are enabled. The interface controller 10 may be configured to control the first control switches 18-$n$ such that any of said first control switches 18-$n$ associated with vehicle systems S-n outside the subset of said first set are disabled.

The first disc-shaped controller 17 in the present embodiment is also depressible to operate a first select switch 19. The first select switch 19 is a mechanical switch, for example a micro-switch, which is operated to confirm a selection to avoid inadvertent operation. In a variant, the first select switch 19 could comprise a touch switch incorporated into the first disc-shaped controller. The first control switches 18-$n$ are arranged in an annular configuration and can optionally be operated as a jog-wheel, for example to cycle through menu options. A user maintains contact with the first disc-shaped controller 17 for a predetermined period of time in order to activate a cycle function and then changes the contact point with the first disc-shaped controller 17 to cycle through the available options.

With reference to FIGS. 2 and 3, the second switch pack 15 comprises a sixth user operable switch 13-6 for controlling the lane keep assist system S-6; a seventh user operable switch 13-7 for controlling the speed limiter system S-7; an eighth user operable switch for communicating with the heated steering wheel system S-8; a ninth user operable switch 13-9 for cancelling a command. The sixth, seventh, eighth and ninth user operable switches 13-6 to 13-9 are each in the form of a capacitance switch. The second switch pack 15 also comprises separate light emitting devices 16-$n$ for illuminating the user operable switches 13-$n$. The light emitting devices 16-$n$ in the present embodiment are in the form of sixth, seventh, eighth and ninth light emitting diodes (LEDs) 16-6 to 16-9 which are associated with the sixth, seventh, eighth and ninth user operable switches 13-6 to 13-9 respectively.

The second switch pack 15 also comprises a second disc-shaped pad 20 for setting parameters associated with the vehicle systems S-n, for example to adjust the vehicle spacing maintained by an adaptive cruise control system and/or adjusting the speed limiter system S-7. The second disc-shaped controller 20 comprises a plurality of second control switches 21-$n$. In the present embodiment, the second control switches 21-$n$ comprise range select switches 21-1, 21-2; and increase and decrease switches 21-3, 21-4. The second control switches 21-$n$ each comprise a touch switch, for example a capacitance switch, but could be implemented as a mechanical switch. The second control switches 21-$n$ may optionally be controlled by the interface controller 10. The interface controller 10 may be configured to control the second control switches 21-$n$ such that only those second control switches 21-$n$ associated with the subset of the first set of vehicle systems S-n installed on the vehicle V are enabled. The interface controller 10 may be configured to control the second control switches 21-$n$ such that any of said second control switches 21-$n$ associated with vehicle systems S-n outside the subset of said first set are disabled.

The second disc-shaped controller 20 in the present embodiment is also depressible to operate a second select switch 22. The second select switch 22 is a mechanical switch, for example a micro-switch, which is operated to confirm a selection to avoid inadvertent operation. In a variant, the second select switch 22 could comprise a touch switch incorporated into the second disc-shaped controller. The second control switches 21-$n$ are arranged in an annular configuration and can optionally be operated as a jog-wheel, for example to cycle through menu options. A user maintains contact with the second disc-shaped controller 20 for a predetermined period of time in order to activate a cycle function and then changes the contact point with the second disc-shaped controller 20 to cycle through the available options.

The first and second switch packs 14, 15 comprise respective first and second panels 23, 24. The user operable switches 13-$n$ in the first and second switch packs 14, 15 are capacitance switches which are disposed on the first and second panels 23, 24. An opaque mask (not shown) is provided on a rear face of the first and second panels 23, 24. A plurality of cut-outs are formed in the opaque mask to define icons associated with each of the user operable switches 13-$n$. The LEDs 16-$n$ associated with the user operable switches 13-$n$ are mounted behind the first and second panels 23, 24. The first and second panels 23, 24 may be formed from a semi-transparent coloured plastics material such that the cut-outs and the LEDs 16-$n$ are hidden until the associated light emitting diode 16-$n$ is energized and outputs light. The interface controller 10 selectively energizes/de-energizes the light emitting devices 16-$n$ to reveal or hide each of the user operable switches 13-$n$. The interface controller 10 is configured to control the light emitting devices 16-$n$ such that only those user operable switches 13-$n$ associated with the subset of the first set of vehicle systems S-n installed on the vehicle V are visible. Any of the user operable switches 13-$n$ provided on the user interface 1 which are associated with vehicle systems S-n which are not installed on the vehicle V remain hidden from view. The interface controller 10 is configured to energize the light emitting device(s) 16-$n$ associated with any enabled user operable switches 13-$n$; and to de-energize the light emitting device(s) 16-$n$ associated with disabled user operable switches 13-$n$. The interface controller 10 may selectively energize/de-energize one or more of the LEDs 16-$n$ to provide a visual indication of when certain functionality is available. By way of example, the second LED 16-2 may be energized to illuminate the second user operable switch 13-2 only when an incoming telephone call is received; and/or the third LED 16-3 may be energized to illuminate the third user operable switch 13-3 only during a telephone call.

In the present embodiment the first and second panels 23, 24 define the first and second disc-shaped controllers 17, 20 respectively. The first and second panels 23, 24 may be contoured to define the first and second disc-shaped controllers 17, 20. The first and second panels 23, 24 are resilient to enable the first and second disc-shaped controllers 17, 20 to be depressed to activate said first and second select switches 19, 22 respectively. The interface controller 10 may be configured selectively to enable/disable the first control switches 18-$n$ and/or the second control switches 21-$n$. The first control switches 18-$n$ and/or the second control switches 21-$n$ may have the same configuration as the user operable switches 13-$n$ so as to remain hidden from view unless enabled by the interface controller 10. The first control switches 18-$n$ may each comprise a light emitting device (not shown), such as an LED, which is energized when that first control switch 18-$n$ is enabled. The second control switches 21-$n$ may each comprise a light emitting device (not shown), such as an LED, which is energized when that second control switch 21-$n$ is enabled. In this arrangement, the interface controller 10 may be configured to control the light emitting devices such that only those first control switches 18-n and/or those second control switches 21-n associated with the subset of the first set of vehicle systems S-n installed on the vehicle V are visible. Any of the first control switches 18-n and/or the second control switches 21-n which are associated with vehicle systems S-n which are not installed on the vehicle V remain hidden from view.

The user interface 1 configures automatically to provide control of those vehicle systems S-n installed on the vehicle V. The interface controller 10 is connected to the vehicle communication network 3 and reads the vehicle configuration file 7 stored in the first memory device 6. The interface controller 10 thereby identifies the subset of the first set of vehicle systems S-n which are installed on the vehicle V. The interface controller 10 is configured to control the user operable switches 13-n such that only those user operable switches 13-n associated with the subset of the first set of vehicle systems S-n installed on the vehicle V are enabled. Moreover, the interface controller 10 is configured to control the light emitting devices 16-n such that only those user operable switches 13-n associated with the subset of the first set of vehicle systems S-n installed on the vehicle V are illuminated. Thus, any of the user operable switches 13-n provided on the user interface 1 which are associated with vehicle systems S-n which are not installed on the vehicle V are disabled and hidden from view.

The user interface 1 described herein can be used in a range of vehicles V having different specifications and/or configurations. In the present embodiment, it is not necessary to provide different variants of the steering wheel 2 for different configurations of the vehicle V. Rather, a standardised steering wheel 2 may be used for different vehicle configurations as the user interface 1 is automatically configured to reflect the available vehicle systems S-n. Moreover, in the event that a vehicle systems S-n is retrofitted to the vehicle V, the vehicle configuration file 7 could be updated and the functionality supported by the existing user interface 1.

The embodiment described herein defines the first set of vehicle systems S-n as comprising a cellular telephone system S-1; an infotainment control system S-2; a voice recognition system S-3; a mode select system S-4; an adaptive cruise control system S-5; a lane keep assist system S-6; a speed limiter system S-7; and a heated steering wheel system S-8. It will be understood that one or more of these vehicle systems S-n may be omitted or replaced, for example to enable different vehicle systems S-n to be controlled. The first set may comprise one or more driver assist system, such as an autonomous emergency braking system and/or a park assist system. The first set may comprise dynamic control functions, such as a traction control system; a suspension control system; a transmission control system; and a throttle mapping system. The first set may also comprise one or more off-road vehicle systems, such as a high/low range gear control system; and/or a driveline control system.

It will be appreciated that various modifications may be made to the embodiment(s) described herein without departing from the scope of the appended claims. The user operable switches 13-n have been described herein as capacitance switches, but it will be understood that other types of user operable sensor may be used, such as a resistance sensor.

The user interface 1 has been described herein as being incorporated into a steering wheel 2. It will be appreciated that the user interface 1 may be used in other applications. For example, the user interface 1 may be mounted in a control panel, for example mounted on a fascia, dashboard or console of the vehicle V.

The interface controller 10 has been described as reading a vehicle configuration file 7 to determine the subset of the first set of vehicle systems S-n which are installed on the vehicle V. In a variant, the interface controller 10 could communicate with one or more of the vehicle systems S-n to determine which of said first set of vehicle systems S-n is installed on the vehicle V.

The invention claimed is:

1. A configurable user interface for a vehicle, comprising:
a plurality of control devices for controlling a first set of vehicle systems, each of the control devices being associated with at least one of the vehicle systems in said first set;
at least one processor for identifying which of the vehicle systems are installed on the vehicle, said identified vehicle systems being in a subset of the first set of vehicle systems, said subset consisting of at least one vehicle system in said first set of vehicle systems installed on the vehicle; and
a memory associated with the at least one processor;
wherein the at least one processor is configured to enable any of said control devices associated with the at least one vehicle system in said subset by enabling an output of control signals from each enabled control device and/or to disable any of said control devices associated with the vehicle systems not contained in said subset by disabling output of control signals from each disabled control device;
wherein the at least one processor is configured to identify which system or systems of the first set of vehicle systems is not installed on the vehicle;
wherein the at least one processor is configured to identify which control device or control devices of the plurality of control devices is for controlling the identified system or systems not installed on the vehicle;
wherein the at least one processor is configured to disable the identified control device or control devices for controlling the identified system or systems not installed on the vehicle; and
wherein the at least one processor is configured to enable only said control devices associated with the at least one vehicle system in said subset.

2. The configurable user interface as claimed in claim 1, wherein
the control devices each comprise at least one light emitting device;
enabling each control device comprises energizing the respective at least one light emitting device; and
disabling each control device comprises de-energizing the respective at least one light emitting device.

3. The configurable user interface as claimed in claim 2, wherein each control device is visible when said light emitting device is energized and at least partially hidden from view when said light emitting device is de-energized.

4. The configurable user interface as claimed in claim 1, wherein said plurality of control devices each comprise a user operable switch.

5. The configurable user interface as claimed in claim 4, wherein
enabling each control device comprises energizing the respective user operable switch; and
disabling each control device comprises de-energizing the respective user operable switch.

6. The configurable user interface as claimed in claim 1, wherein said at least one processor is configured to communicate with a memory device disposed on the vehicle to identify the subset of said first set of vehicle systems.

7. The configurable user interface as claimed in claim 6, wherein said at least one processor is configured to read a vehicle configuration file stored in said memory device.

8. The configurable user interface as claimed in claim 1, wherein said at least one processor is configured to communicate with one or more of the first set of vehicle systems to identify the subset of said first set of vehicle systems installed on the vehicle.

9. The configurable user interface as claimed in claim 1, wherein
the subset is a proper subset consisting of some of the first set of vehicle systems; or
the subset is an improper subset consisting of all of the first set of vehicle systems.

10. The configurable user interface as claimed in claim 1, wherein the vehicle systems comprise one or more of:
a cellular telephone system;
an infotainment control system;
a voice recognition system;
a shortcut select system;
an adaptive cruise control system;
a lane keep assist system;
a speed limiter system; and
a heated steering wheel system.

11. A vehicle steering wheel comprising the configurable user interface of claim 1.

12. A vehicle comprising the vehicle steering wheel as claimed in claim 11.

13. A vehicle comprising the configurable user interface of claim 1.

14. A method of configuring a user interface for a vehicle, the user interface comprising a plurality of control devices for controlling a first set of vehicle systems, each of the control devices being associated with at least one of the vehicle systems in said first set, the method comprising:
identifying which of the vehicle systems are installed on the vehicle, said identified vehicle systems being in a subset of the first set of vehicle systems, the subset consisting of at least one vehicle system in said first set of vehicle systems installed on the vehicle; and
at least one of
enabling any of said control devices associated with the vehicle systems contained in said subset by enabling an output of control signals from each enabled control device; and
disabling any of said control devices associated with the vehicle systems not contained in said subset by disabling output of control signals from each disabled control device,
including
identifying which system or systems of the first set of vehicle systems is not installed on the vehicle,
identifying which control device or control devices of the plurality of control devices is for controlling the identified system or systems,
disabling the identified control device or control devices, and
enabling only said control devices associated with the at least one vehicle system in said subset.

15. The method as claimed in claim 14, wherein each control device comprises at least one light emitting device; and
the method comprising:
enabling each control device by energizing the respective at least one light emitting device; and
disabling each control device by de-energizing the respective at least one light emitting device.

16. The method as claimed in claim 14, comprising communicating with one or more of the vehicle systems to identify the subset of said first set of vehicle systems installed on the vehicle.

17. A configurable user interface for a vehicle, the configurable user interface comprising:
a plurality of control devices for controlling a first set of vehicle systems, each of the control devices being associated with at least one of the vehicle systems in said first set;
at least one processor for identifying which of the vehicle systems are installed on the vehicle, said identified vehicle systems being in a subset of the first set of vehicle systems, the subset consisting of at least one vehicle system in the first set of vehicle systems installed on the vehicle; and
a memory associated with the at least one processor;
wherein the at least one processor is configured to communicate with one or more of the first set of vehicle systems to identify the subset of the first set of vehicle systems installed on the vehicle;
wherein the at least one processor is configured to enable any of said control devices associated with the vehicle systems contained in said subset by enabling an output of control signals from each enabled control device and/or to disable any of said control devices associated with the vehicle systems not contained in said subset by disabling output of control signals from each disabled control device;
wherein the at least one processor is configured to identify which system or systems of the first set of vehicle systems is not installed on the vehicle,
wherein the at least one processor is configured to identify which control device or control devices of the plurality of control devices is for controlling the identified system or systems not installed on the vehicle,
wherein the at least one processor is configured to disable the identified control device or control devices for controlling the identified system or systems not installed on the vehicle, and
wherein the at least one processor is configured to enable only said control devices associated with the at least one vehicle system in said subset.

* * * * *